US008997326B2

(12) United States Patent
Milamon et al.

(10) Patent No.: US 8,997,326 B2
(45) Date of Patent: Apr. 7, 2015

(54) PROCESS FOR MANUFACTURING A LAMINATED GLAZING UNIT AND LAMINATED GLAZING UNIT

(75) Inventors: Christophe Milamon, Plessis de Roye (FR); Fabien Levasseur, Longueil Annel (FR); Jean-Clement Nugue, Lamorlaye (FR)

(73) Assignee: Saint-Gobain Glass France, Courbevoie (FR)

( * ) Notice: Subject to any disclaimer, the term of this patent is extended or adjusted under 35 U.S.C. 154(b) by 239 days.

(21) Appl. No.: 13/265,441

(22) PCT Filed: Apr. 19, 2010

(86) PCT No.: PCT/FR2010/050749
§ 371 (c)(1),
(2), (4) Date: Oct. 20, 2011

(87) PCT Pub. No.: WO2010/122260
PCT Pub. Date: Oct. 28, 2010

(65) Prior Publication Data
US 2012/0034439 A1 Feb. 9, 2012

(30) Foreign Application Priority Data
Apr. 20, 2009 (FR) .................................. 09 52567

(51) Int. Cl.
B23Q 17/00 (2006.01)
B32B 17/10 (2006.01)

(52) U.S. Cl.
CPC ..... B32B 17/10036 (2013.01); B32B 17/10761 (2013.01)

(58) Field of Classification Search
USPC .............................. 29/407.01, 407.05, 407.08
See application file for complete search history.

(56) References Cited

U.S. PATENT DOCUMENTS 6,432,522 B1 8/2002 Friedman et al.
7,892,629 B2 * 2/2011 Rehfeld et al. ................. 428/212
(Continued)

FOREIGN PATENT DOCUMENTS

FR 2 838 517 10/2003
WO 2007 135317 11/2007

OTHER PUBLICATIONS

U.S. Appl. No. 13/381,530, filed Dec. 29, 2011, Nugue, et al.
(Continued)

Primary Examiner — Alexander P Taousakis
(74) Attorney, Agent, or Firm — Oblon, McClelland, Maier & Neustadt, L.L.P.

(57) ABSTRACT

According to this process for manufacturing a laminated glazing unit so that it withstands predetermined stresses, a reference laminated glazing unit is identified that withstands the predetermined stresses and that comprises at least one substrate and one interlayer having the same chemical compositions as those of the laminated glazing unit to be manufactured; the tear strength ($J_{c\text{-}ref}$) of the interlayer of the reference laminated glazing unit, and also the interlayer thickness ($e_{i\text{-}ref}$) and the substrate thickness ($e_{g\text{-}ref}$) of the reference laminated glazing unit are then determined; then, using a graph ($C_4$) representative of the minimum interlayer tear strength ($J_{c\text{-}min}$) required so that any laminated glazing unit, comprising at least one substrate and one interlayer having the same chemical compositions as those of the laminated glazing unit to be manufactured, withstands the predetermined stresses, as a function of the interlayer thickness ($e_i$) and/or of the substrate thickness ($e_g$), a combination of optimum values ($e_{i\text{-}opt}$, $e_{g\text{-}opt}$) of the interlayer thickness and of the substrate thickness is deduced; the laminated glazing unit is then sized with an interlayer thickness ($e_{i\text{-}dim}$) and a substrate thickness ($e_{g\text{-}dim}$) that are greater than or equal to the optimum values ($e_{i\text{-}opt}$, $e_{g\text{-}opt}$).

11 Claims, 5 Drawing Sheets

(56) References Cited

U.S. PATENT DOCUMENTS

| | | |
|---|---|---|
| 2003/0118840 A1 | 6/2003 | Moran et al. |
| 2004/0157071 A1 | 8/2004 | Nugue et al. |
| 2005/0106398 A1 | 5/2005 | Moran et al. |
| 2009/0029158 A1 | 1/2009 | Moran et al. |
| 2009/0159362 A1 | 6/2009 | Boure et al. |
| 2010/0295331 A1* | 11/2010 | Rehfeld et al. ............... 296/84.1 |

OTHER PUBLICATIONS

International Search Report Issued Aug. 4, 2010 in PCT/FR10/050749 filed Apr. 19, 2010.

* cited by examiner

PROCESS FOR MANUFACTURING A LAMINATED GLAZING UNIT AND LAMINATED GLAZING UNIT

CROSS REFERENCE TO RELATED APPLICATIONS

The present application is the national stage of international application PCT/FR2010/050749, filed on Apr. 19, 2010, published as WO 2010/122260 on Oct. 28, 2010, the text of which is incorporated by reference, and claims the benefit of the filing date of French Application No. 0952567 filed on Apr. 20, 2009, the text of which is also incorporated by reference.

The present invention relates to a process for manufacturing a laminated glazing unit which comprises at least one substrate having a glass function and at least one polymer interlayer. The invention also relates to a laminated glazing unit and to a polymer interlayer for a laminated glazing unit.

Within the meaning of the invention, a substrate having a glass function denotes a substrate made of glass and/or plastic, where the expression "substrate made of plastic" is understood to mean a substrate containing one or more organic polymer substances of high molecular weight. Furthermore, a polymer interlayer is a monolithic interlayer or a composite interlayer constituted by the assembly of several polymer components in the form of layers, resins or films. Within the meaning of the invention, the expression "laminated glazing unit" is also understood to mean any glazing structure comprising at least one substrate having a glass function and at least one interlayer, including a structure comprising a single substrate and a single interlayer combined together.

Laminated glazing units, due to their good mechanical strength properties, are conventionally used to equip vehicles or buildings. By way of examples, the laminated glazing units comprise glazing units for vehicles, especially automotive vehicles, in particular windshields; façade glazing units of buildings; or photovoltaic modules comprising at least one glass substrate and one or more photovoltaic cells bonded to the substrate by means of a lamination interlayer. The interlayer of a laminated glazing unit plays a vital role in the mechanical strength of the glazing unit. In particular, upon impact, before the glass breaks, the interlayer advantageously enables some of the energy to be absorbed by viscous dissipation. Furthermore, the interlayer guarantees to a great extent the integrity of the structure of the glazing unit when the glass is completely shattered, making it possible, thanks to the adhesion of the glass fragments to the interlayer and the structural retention of the assembly to its support, to prevent glass shards from flying off and consequently injuring someone.

The interlayer of a laminated glazing unit may also be selected in order to have, in addition to its mechanical properties, acoustic insulation properties, especially for laminated glazing units intended to equip vehicles and buildings, with a view to attenuating the perception of airborne and/or solid-borne noise reaching the passenger compartment through the glazing unit. For example, polyvinyl butyral (PVB), which is an interlayer widely used for its mechanical properties, may also provide the laminated glazing unit with acoustic properties when its composition is properly adjusted.

Building and automobile laminated glazing units must satisfy normative requirements as regards their mechanical strength and, in particular, must have good impact resistance, whether this is for accidental collisions, falling objects or people, or else thrown objects such as during acts of vandalism or break-in or ballistic firings. The laminated glazing units must meet criteria of resistance to soft impacts (classes 1B1 and 2 B2 of the EN 12600 standard), or to hard impacts (R43 standard, EN 356 standard). Industrially manufactured laminated glazing units are currently formed from substrates and interlayers that have standardized thicknesses, the required mechanical strength performances being obtained by the superposition of several plies of interlayers of standard thickness. However, such a method of manufacturing laminated glazing units, with an interlayer thickness which is a multiple of a known thickness, very often results in an oversizing of the laminated glazing units. This results in an additional cost and an excess weight of these laminated glazing units. Furthermore, this method of manufacture by superposition of plies of interlayers of standard thickness does not make it possible to freely adjust the structure of the laminated glazing units in order to improve other properties of the laminated glazing units when necessary, such as the light transmission of the assemblies, at one or more faces of the laminate.

It is these drawbacks that the invention intends more particularly to solve by proposing a process for manufacturing a laminated glazing unit which guarantees that the laminated glazing unit obtained is, on the one hand, suitable for withstanding predetermined stresses corresponding to normative requirements and, on the other hand, sized with optimized substrate and interlayer thicknesses with respect to the mechanical strength requirements, these optimized thicknesses corresponding to a minimized total thickness of the laminated glazing unit.

For this purpose, one subject of the invention is a process for manufacturing a laminated glazing unit so that it withstands predetermined stresses, the laminated glazing unit comprising at least one substrate having a glass function of given chemical composition and at least one polymer interlayer of given chemical composition, characterized in that it comprises steps in which:

a reference laminated glazing unit is identified that withstands the predetermined stresses and that comprises at least one substrate and one interlayer having the same chemical compositions as those of the laminated glazing unit to be manufactured;
  the tear strength of the interlayer of the reference laminated glazing unit, the interlayer thickness of the reference laminated glazing unit and the substrate thickness of the reference laminated glazing unit are determined;
  using a graph representative of the minimum interlayer tear strength required so that any given laminated glazing unit, comprising at least one substrate and one interlayer having the same chemical compositions as those of the laminated glazing unit to be manufactured, withstands the predetermined stresses, as a function of the interlayer thickness of said given laminated glazing unit and/or of the substrate thickness of said given laminated glazing unit, a combination of optimum values of the interlayer thickness and of the substrate thickness is deduced which corresponds to a value of the minimum required interlayer tear strength equal to the tear strength of the interlayer of the reference laminated glazing unit;
  the laminated glazing unit is sized with a chosen interlayer thickness greater than or equal to said optimum value of the interlayer thickness and a chosen substrate thickness greater than or equal to said optimum value of the substrate thickness.

Within the meaning of the invention, a combination of optimum values of the interlayer thickness and of the substrate thickness is a combination for which the laminated glazing unit withstands the predetermined stresses and the total thickness of the laminated glazing unit is minimized. Furthermore, when the laminated glazing unit comprises several substrates having a glass function, the expression "of given chemical composition" means that all these substrates having a glass function have the same chemical composition, which is said given chemical composition. Similarly, when the laminated glazing unit comprises several polymer interlayer films, the expression "of given chemical composition" means that all these interlayer films have the same chemical composition, which is said given chemical composition.

According to other advantageous features of a process in accordance with the invention, considered in isolation or according to all the technically possible combinations:

The laminated glazing unit is sized with a chosen substrate thickness equal to the substrate thickness of the reference laminated glazing unit and the process comprises steps in which:

using a graph representative of the minimum interlayer tear strength required so that any given laminated glazing unit, comprising at least one substrate and one interlayer having the same chemical compositions as those of the laminated glazing unit to be manufactured, withstands the predetermined stresses, as a function of the interlayer thickness of said given laminated glazing unit, this graph being established for a substrate thickness of said given laminated glazing unit equal to the substrate thickness of the reference laminated glazing unit, the minimum required interlayer thickness is deduced which corresponds to a value of the minimum required interlayer tear strength equal to the tear strength of the interlayer of the reference laminated glazing unit;

the laminated glazing unit is sized with a chosen interlayer thickness greater than or equal to said minimum required interlayer thickness and a chosen substrate thickness equal to the substrate thickness of the reference laminated glazing unit.

The laminated glazing unit is sized with a chosen interlayer thickness equal to the interlayer thickness of the reference laminated glazing unit and the process comprises steps in which:

using a graph representative of the minimum interlayer tear strength required so that any given laminated glazing unit, comprising at least one substrate and one interlayer having the same chemical compositions as those of the laminated glazing unit to be manufactured, withstands the predetermined stresses, as a function of the substrate thickness of said given laminated glazing unit, this graph being established for an interlayer thickness of said given laminated glazing unit equal to the interlayer thickness of the reference laminated glazing unit, the minimum required substrate thickness is deduced which corresponds to a value of the minimum required interlayer tear strength equal to the tear strength of the interlayer of the reference laminated glazing unit;

the laminated glazing unit is sized with a chosen interlayer thickness equal to the interlayer thickness of the reference laminated glazing unit and a chosen substrate thickness greater than or equal to the minimum required substrate thickness.

At least one of the chosen thicknesses is strictly less than the corresponding thickness of the reference laminated glazing unit.

Prior to the sizing of the laminated glazing unit so that it withstands the predetermined stresses, the graph, representative of the minimum interlayer tear strength required so that any given laminated glazing unit, comprising at least one substrate and one interlayer having the same chemical compositions as those of the laminated glazing unit to be manufactured, withstands the predetermined stresses, as a function of the interlayer thickness of said given laminated glazing unit and/or of the substrate thickness of said given laminated glazing unit, is plotted from mechanical strength tests carried out on laminated glazing units having different compositions in terms of interlayer thickness and/or of substrate thickness.

Prior to the sizing of the laminated glazing unit so that it withstands the predetermined stresses, it is verified that the adhesion of the interlayer of the laminated glazing unit to be manufactured is satisfactory with respect to the substrate of this laminated glazing unit to be manufactured.

It is verified that the adhesion of the interlayer of the laminated glazing unit to be manufactured is satisfactory with respect to the substrate of this laminated glazing unit to be manufactured by twisting a sample of the interlayer bonded to the substrate, by measuring the torsional force at which separation of the interlayer from the substrate is initiated, and by calculating from this force the corresponding adhesion shear strength, and by comparing this value of the adhesion strength with a range of admissible values so that any laminated glazing unit withstands the predetermined stresses.

The reference laminated glazing unit which withstands the predetermined stresses is identified by carrying out a mechanical strength test on the reference laminated glazing unit.

The tear strength of the interlayer of the reference laminated glazing unit is determined using the Tielking method.

Prior to the sizing of the laminated glazing unit so that it withstands the predetermined stresses, it is verified that the acoustic insulation properties of the interlayer of the laminated glazing unit to be manufactured are satisfactory.

The acoustic insulation properties of the interlayer of the laminated glazing unit to be manufactured are satisfactory when the interlayer has a loss factor tan $\delta$ greater than 0.6 and a shear modulus G' less than $2 \times 10^7$ N/m$^2$ for a temperature of 20° C. and a frequency of 50 Hz.

Another subject of the invention is a laminated glazing unit suitable for withstanding predetermined stresses, comprising at least one substrate having a glass function that has a given substrate chemical composition and at least one polymer interlayer that has a given interlayer chemical composition, characterized in that its interlayer thickness is greater than or equal to an optimum value of the interlayer thickness, within a limit of 20% above this optimum value, and its substrate thickness is greater than or equal to an optimum value of the substrate thickness, within a limit of 20% above this optimum value, where the combination of optimum values corresponds to a minimum interlayer tear strength value required so that any laminated glazing unit, comprising at least one substrate having said given substrate chemical composition and one interlayer having said given interlayer chemical composition, withstands the predetermined stresses.

Here too, the expression "combination of optimal values of the interlayer thickness and of the substrate thickness" is understood to mean a combination for which the total thickness of the laminated glazing unit is minimized. Furthermore, when the laminated glazing unit comprises several substrates having a glass function, the expression "having a given substrate chemical composition" means that all these substrates having a glass function have the same chemical composition, which is said given substrate chemical composition. Similarly, when the laminated glazing unit comprises several polymer interlayer films, the expression "having a given interlayer chemical composition" means that all these interlayer films have the same chemical composition, which is said given interlayer chemical composition.

According to other advantageous features of a laminated glazing unit in accordance with the invention:

For a given substrate thickness, its interlayer thickness is greater than or equal to a minimum required interlayer thickness value, within a limit of 20% above this value, where the combination of the given substrate thickness and of the minimum required interlayer thickness corresponds to a minimum interlayer tear strength value required so that any laminated glazing unit, comprising at least one substrate having said given substrate chemical composition and one interlayer having said given interlayer chemical composition, withstands the predetermined stresses.

For a given interlayer thickness, its substrate thickness is greater than or equal to a minimum required substrate thickness value, within a limit of 20% above this value, where the combination of the given interlayer thickness and of the minimum required substrate thickness corresponds to a minimum interlayer tear strength value required so that any laminated glazing unit, comprising at least one substrate having said given substrate chemical composition and one interlayer having said given interlayer chemical composition, withstands the predetermined stresses.

Its interlayer has a loss factor tan δ greater than 0.6 and a shear modulus G' less than $2 \times 10^7$ N/m² for a temperature of 20° C. and a frequency of 50 Hz.

The laminated glazing unit is suitable for withstanding the stresses corresponding to class 1B1 of the EN 12600 standard, and comprises two glass substrates having a thickness of 3 mm and a PVB interlayer having a thickness $e_i$ such that 0.5 mm≤$e_i$≤0.74 mm bonded between the glass substrates.

The laminated glazing unit is suitable for withstanding the stresses corresponding to class 2B2 of the EN 12600 standard, and comprises two glass substrates having a thickness of 3 mm and a PVB interlayer having a thickness $e_i$ such that 0.25 mm≤$e_i$≤0.36 mm bonded between the glass substrates.

The laminated glazing unit is suitable for withstanding the stresses corresponding to the R43 standard, and comprises two glass substrates having respective thicknesses $e_{g1}$=1.8 mm and $e_{g2}$=1.4 mm and a PVB interlayer having a thickness $e_i$ such that 0.4 mm≤$e_i$≤0.74 mm bonded between the glass substrates.

Another subject of the invention is a polymer interlayer, of given interlayer chemical composition, for a laminated glazing unit intended to withstand predetermined stresses and comprising at least one substrate having a glass function that has a given substrate chemical composition and a given thickness bonded to the interlayer, characterized in that the thickness of the interlayer is greater than or equal to a minimum required interlayer thickness value, within a limit of 20% above this value, where the combination of the given substrate thickness and of the minimum required interlayer thickness corresponds to a minimum interlayer tear strength value required so that any laminated glazing unit, comprising at least one substrate having said given substrate chemical composition and one interlayer having said given interlayer chemical composition, withstands the predetermined stresses.

Within the meaning of the invention, the expression "interlayer thickness" is understood to mean the nominal thickness of the interlayer, the interlayer possibly locally having variations in thickness about the nominal thickness value.

According to other advantageous features of an interlayer in accordance with the invention:

The PVB interlayer, for a laminated glazing unit intended to withstand the stresses corresponding to class 1B1 of the EN 12600 standard, has a thickness $e_i$ such that 0.5 mm≤$e_i$≤0.74 mm.

The PVB interlayer, for a laminated glazing unit intended to withstand the stresses corresponding to class 2B2 of the EN 12600 standard, has a thickness $e_i$ such that 0.25 mm≤$e_i$≤0.36 mm.

The PVB interlayer, for a laminated glazing unit intended to withstand the stresses corresponding to the R43 standard, has a thickness $e_i$ such that 0.4 mm≤$e_i$≤0.74 mm.

Finally, one subject of the invention is the use of a polymer interlayer having a given interlayer chemical composition and a thickness greater than or equal to a minimum required interlayer thickness value, within a limit of 20% above this minimum value, as the sole lamination interlayer of a laminated glazing unit suitable for withstanding predetermined stresses and comprising at least one substrate having a glass function that has a given substrate chemical composition, where the combination of the substrate thickness of the laminated glazing unit and of the minimum required interlayer thickness corresponds to a minimum interlayer tear strength value required so that any laminated glazing unit, comprising at least one substrate having said given substrate chemical composition and one interlayer having said given interlayer chemical composition, withstands the predetermined stresses.

Within the context of this generally defined use, subjects of the invention are, in particular:

The use of a PVB interlayer having a thickness $e_i$ such that 0.5 mm≤$e_i$≤0.74 mm as the sole lamination interlayer of a laminated glazing unit suitable for withstanding the stresses corresponding to class 1B1 of the EN 12600 standard.

The use of a PVB interlayer having a thickness $e_i$ such that 0.25 mm≤$e_i$≤0.36 mm as the sole lamination interlayer of a laminated glazing unit suitable for withstanding the stresses corresponding to class 2B2 of the EN 12600 standard.

The use of a PVB interlayer having a thickness $e_i$ such that 0.4 mm≤$e_i$≤0.74 mm as the sole lamination interlayer of a laminated glazing unit suitable for withstanding the stresses corresponding to the R43 standard.

The features and advantages of the invention will appear in the following description of several embodiments of a process for sizing a laminated glazing unit according to the invention, given solely by way of example and with reference to the appended drawings in which:

FIG. 1 is a cross section of a laminated glazing unit comprising two substrates having a glass function and one polymer interlayer;

FIG. 2 is a graph representative of the minimum interlayer tear strength required so that a laminated glazing unit withstands the stresses corresponding to the classes 1B1 and 2B2 of the EN 12600 standard, as a function of the interlayer thickness of the laminated glazing unit, established for a laminated glazing unit comprising two glass substrates having a thickness of 3 mm and an interlayer having an adhesion strength between, respectively, 3.1 MPa and 6.8 MPa for class 1B1, and 4 MPa and 9.6 MPa for class 2B2;

FIG. 3 is a graph analogous to the graph of FIG. 2, that is representative of the minimum interlayer tear strength required so that a laminated glazing unit withstands the stresses corresponding to the R43 standard, as a function of the interlayer thickness of the laminated glazing, established for a laminated glazing unit comprising two glass substrates having a thickness of 2.1 mm and an interlayer having an adhesion strength between 2 MPa and 5 MPa and for a drop height of 4 m;

FIG. 4 is a three-dimensional graph, which is representative of the minimum interlayer tear strength required so that a laminated glazing unit withstands the stresses corresponding to the R43 standard, as a function both of the interlayer thickness and of the substrate thickness of the laminated glazing unit, established for a laminated glazing unit comprising an interlayer having an adhesion strength between 2 MPa and 5 MPa and for a drop height of 4 m;

Figure 1:
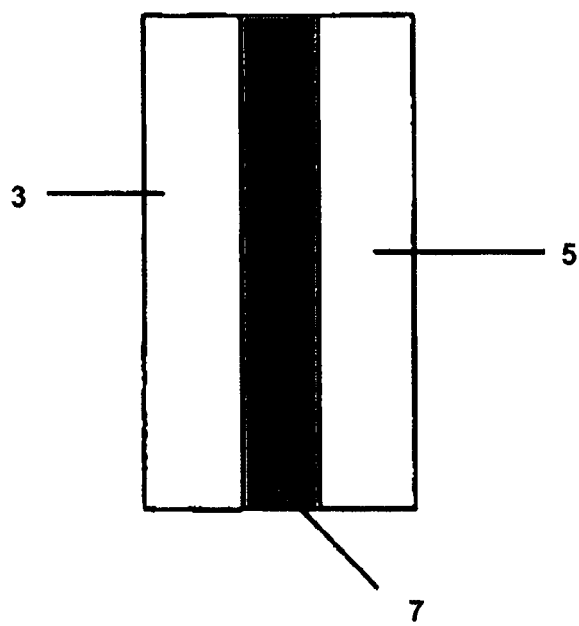
Figure 2:
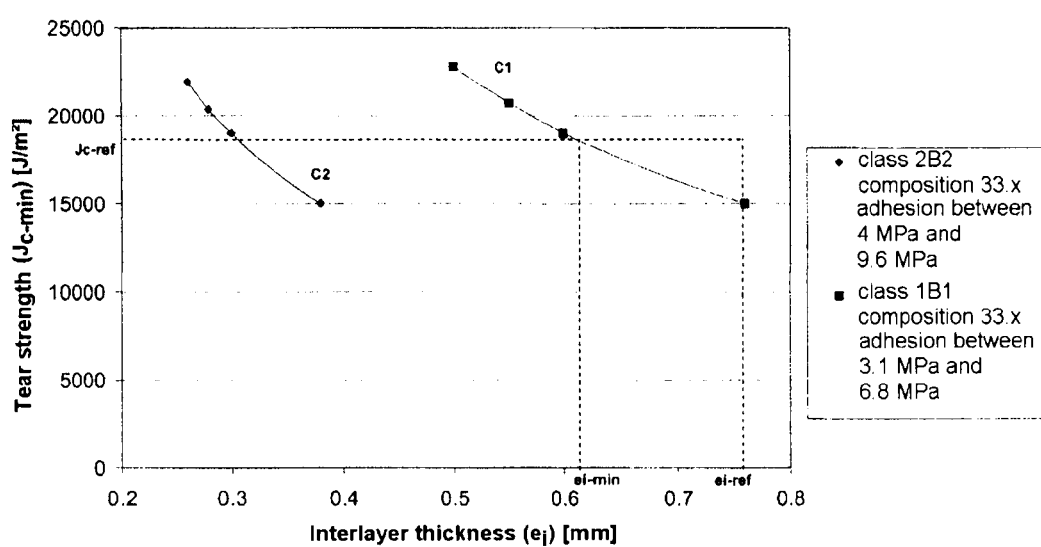

In the first embodiment of the manufacturing process according to the invention, illustrated by the graph of FIG. 2, it is sought to size a laminated glazing unit so that it withstands soft impacts (classes 1B1 and 2B2 of the EN 12600 standard). By way of example and as represented in FIG. 1, the laminated glazing unit 1 to be manufactured is a laminated glazing unit comprising two glass substrates 3 and 5, between which an interlayer 7 of given chemical composition is bonded, this specific chemical composition being denoted by $c_i$, for example a PVB-based interlayer.

In accordance with the invention, with a view to sizing the laminated glazing unit 1, it is first verified that the adhesion of the interlayer 7 with respect to the substrates 3 and 5 is satisfactory. For this purpose, the adhesion is evaluated on the basis of the test and calculation method described in patent application EP-A-1 495 305, which is repeated hereinbelow.

Figure 5:
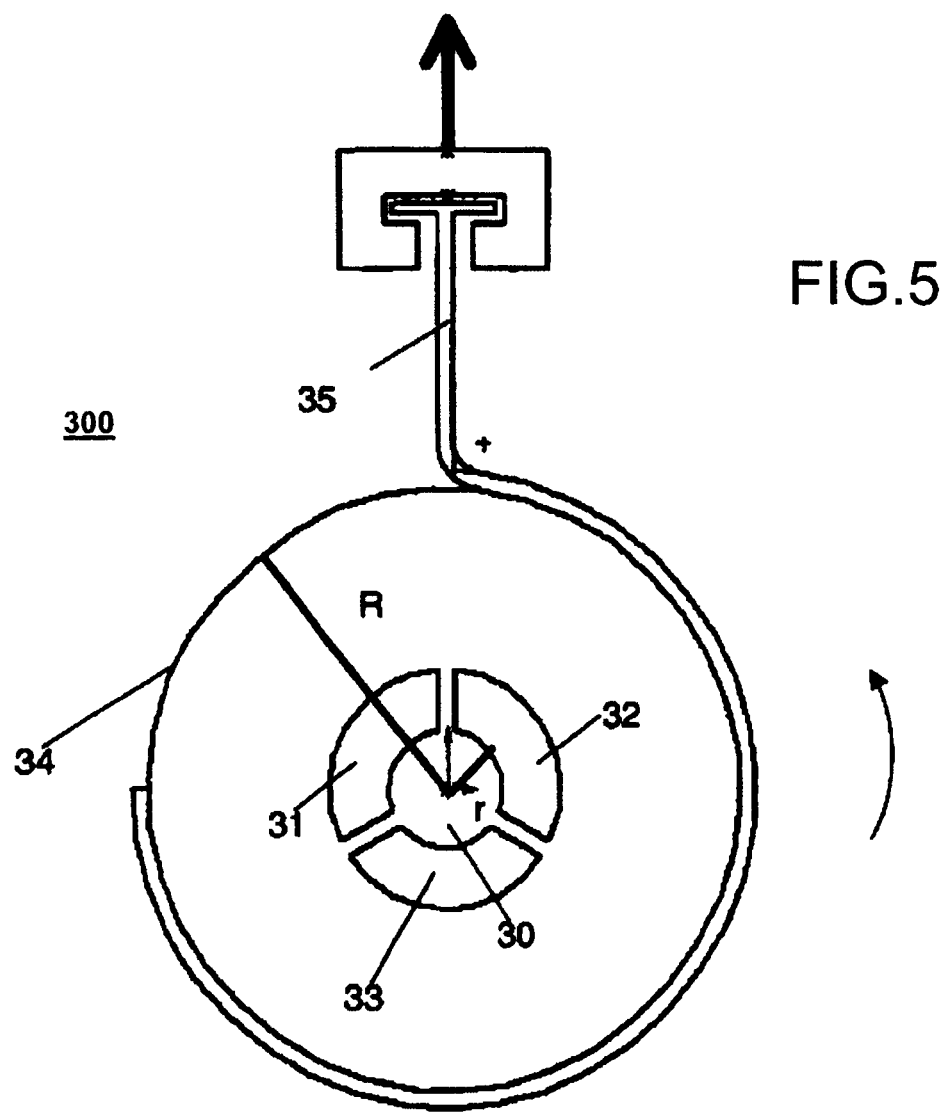
FIG. 5 is a schematic front view of an experimental device for evaluating the adhesion of an interlayer with respect to substrates with which it is combined.

Firstly, a torsional stress is exerted on a sample of the laminated glazing unit 1, until the onset of debonding of the interlayer 7 relative to at least one of the substrates 3 and 5. In practice, the test is carried out on a round sample 30 of the glazing unit 1, having a radius r equal to 10 mm, for example using a torsion device 300 of known type, illustrated in FIG. 5.

The device 300 comprises three jaws 31, 32, 33 and a pulley 34 of radius R equal to 100 mm connected to a drive chain 35 of vertical axis. The jaws are each in the form of 120° circular arcs, so as to grip the entire sample. The surface coating of the jaws is made of a material that is mechanically compatible with the glass, for example aluminum, Teflon®, or polyethylene.

One of the jaws is held fixed against a frame, whilst another jaw is fastened to the pulley 34 that is intended to rotate in order to exert a torsion on the sample. The pulley 34 is made to rotate by the movement of the chain 35 connected to the pulley. The chain is pulled at a minimum constant speed of 35 to 50 mm/min.

A force sensor is used to measure the force F needed to initiate the onset of debonding of the interlayer 7 as the sample is being twisted. From this it is then possible to deduce, by calculation, the adhesion shear strength using the known formula:

$$\tau = \frac{2FR}{\pi r^3},$$

where F is the force needed to initiate the onset of debonding of the interlayer 7, R is the radius of the pulley 34 and r is the radius of the sample.

As explained in application EP-A-1 495 305, the device 300 is however bulky, which means that the tests must be carried out in a laboratory. The device 300 is therefore ill-suited to measurements of the "process indicator" type on a laminated glazing manufacturing line. However, for the manufacture of laminated glazing units, although the composition of the polymeric interlayer is designed to meet the strength values set by the invention, poor adhesion of the interlayer may nevertheless occur in the finished product due to parameters associated with the manufacturing process of the glazing unit, such as the storage conditions of the interlayer, the glass washing quality, or else the temperature and the pressure forces in the course of the calendering step during assembly of the glass and the interlayer, which influence the quality of the bonding.

Figure 6:
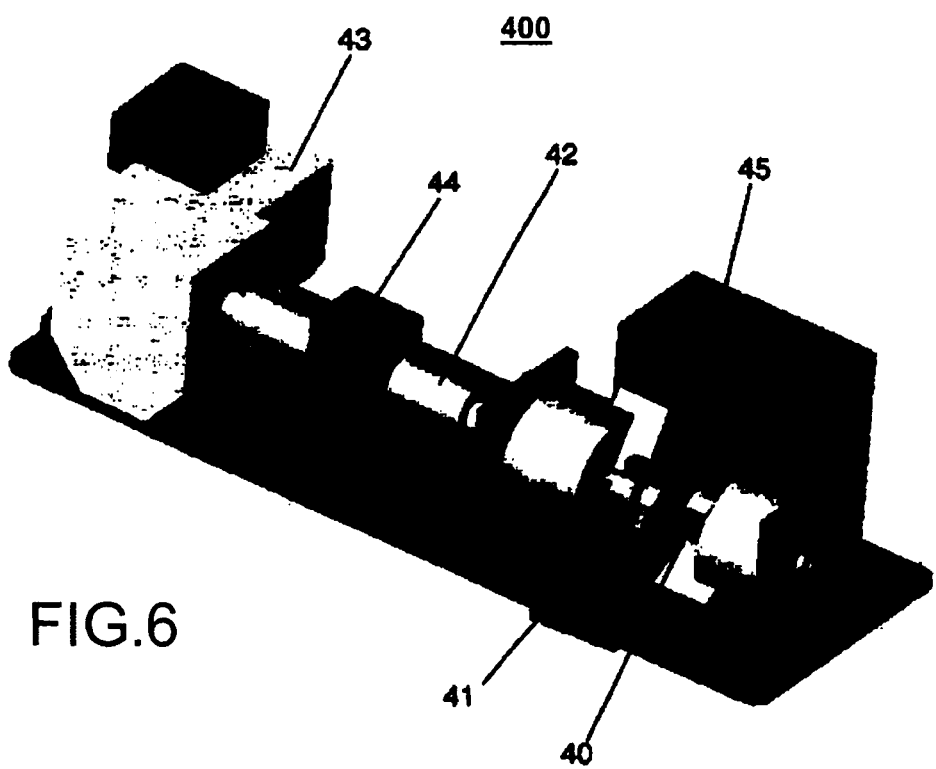
FIG. 6 is a perspective view of a variant of a device for evaluating the adhesion of an interlayer with respect to substrates with which it is combined.

In order to carry out measurements during monitoring of the manufacture close to the manufacturing line, so that it becomes possible to quickly intervene in the process in response to poor measured strength values, it is possible, as a variant, to use another measuring device 400 which, advantageously, is more compact and easily transportable. This device 400, represented in FIG. 6, is miniaturized to around 60 cm by 20 cm and comprises two three-jaw systems 40 and 41, a rotating shaft 42, a motor 43 for rotating the shaft, a torque meter 44 and a box 45 housing the computing elements.

The round sample of the laminated glazing unit 1 is intended to be sandwiched between the two jaw systems 40 and 41, one of the systems 40 being fixed while the other is capable of being moved and rotated by means of its connection to the shaft 42. The torque meter is placed between the motor and the moveable jaw system 41. The rotation speed of the shaft depends on the thickness of the interlayer. By way of example, for an interlayer having a thickness of 0.76 mm, the rotation is of the order of 0.08 rpm.

The system 41 rotates and when the measured torque reverses, the initiation of debonding of the interlayer 7 has taken place. The torque meter is connected to the computing elements of the box 45, which includes a display part on which the value of the adhesion strength $\tau$ can be read directly.

Whichever device is used, with a view to having a detailed evaluation of the dispersion in the value of the adhesion strength $\tau$, it is preferred to repeat the test on several samples, for example a minimum number of five samples, and to calculate an average of the strength $\tau$ together with its standard deviation.

The adhesion of the interlayer 7 is suitable if the value of the adhesion strength $\tau$ is within a range of admissible values in order for any laminated glazing unit to withstand the stresses corresponding to the targeted class of the EN 12600 standard. According to the invention, this range of admissible values is determined experimentally, for each of the classes 1B1 and 232 of the EN 12600 standard, from normalized mechanical strength tests defined in the standard, which are carried out on laminated glazing units of different compositions.

The range of admissible values, within which any value of the adhesion strength $\tau$ is suitable for satisfying the criterion of adhesion, is all of the values below 6.8 MPa for class 1B1 of the EN 12600 standard and below 9.6 MPa for class 2B2 of the EN 12600 standard. In practice, the range of admissible values considered is equal to 3.1 MPa-6.8 MPa for class 1B1 and 4 MPa-9.6 MPa for class 2B2, the lower limit of these ranges of values being determined in order to ensure a good transparency of the glazing unit, independently of the mechanical strength considerations of the glazing unit.

Once it has been verified that the adhesion strength $\tau$ of the interlayer 7 lies within the range of admissible values of the targeted class of the EN 12600 standard, the actual sizing of the laminated glazing unit 1 is carried out.

In this embodiment, the glazing unit 1 is sized with a total glass substrate thickness $e_{g\text{-}dim}$ in the laminated glazing unit that is fixed and equal to 6 mm, which corresponds, for example, to a thickness of each glass substrate 3 and 5 of 3 mm.

With a view to sizing the interlayer 7, firstly a curve $C_1$ or $C_2$, seen in FIG. 1 and representative of the minimum interlayer tear strength $J_{c\text{-}min}$ required for any given laminated glazing unit, comprising at least one glass substrate and one interlayer having the same chemical composition $c_i$ as the interlayer 7 of the laminated glazing unit 1 to be manufactured, to withstand the stresses corresponding to the targeted class, 1B1 or 2B2, of the EN 12600 standard, is plotted as a function of the interlayer thickness $e_i$ of said any given laminated glazing unit, this curve being established for a substrate thickness $e_g$ equal to 6 mm. In practice, the curve $C_1$ or $C_2$ is obtained from normalized mechanical strength tests defined in the EN 12600 standard, carried out on laminated glazing units which each comprise at least one glass substrate and an interlayer of chemical composition $c_i$ and which differ from one another by their interlayer thickness value, that is to say by their composition in terms of thickness of their interlayer.

Next, a reference laminated glazing unit is identified which withstands the stresses corresponding to the targeted class, 1B1 or 2B2, with a glass substrate thickness equal to 6 mm and which comprises an interlayer having the same chemical composition $c_i$ as the interlayer 7 of the laminated glazing unit 1 to be sized.

An example of a reference laminated glazing unit for sizing the glazing unit 1 in accordance with the requirements of class 1B1 is of "33.2" type, that is to say comprises two glass substrates each having a thickness of 3 mm and two interlayer plies having the specific composition $c_i$, each ply of the interlayer having a standardized thickness of 0.38 mm, which corresponds to a total interlayer thickness $e_{i\text{-}ref}$ of the reference laminated glazing unit equal to 0.76 mm. The resistance of this reference glazing unit to the stresses corresponding to class 1B1 is verified by a normalized mechanical strength test.

The tear strength $J_{c\text{-}ref}$ of the interlayer of the reference glazing unit "33.2" is then determined. The tear strength is evaluated based on a method of calculating the crack tip (or root) energy J developed by Tielking, which is explained in patent applications EP-A-1 151 855 and EP-A-1 495 305.

The tear strength of the interlayer is a characteristic intrinsic to the material constituting it. It is characterized by an energy value representative of the energy needed to propagate a crack initiated in the material. This energy, known as the critical energy $J_c$, is different for each type of material and is independent of the thickness of the interlayer film.

The tear strength or critical energy $J_c$, is given in a known manner by an energy method based on the Rice's J integral, which defines the energy localized at the tip of a crack in a film subjected to very high stresses at the location of a crack. It is written in the simplified mathematical form:

$$J = -\frac{1}{e_1}\left(\frac{\partial U}{\partial a}\right),$$

for a given stretch $\delta$ of the sample tested which will hereafter be called the displacement $\delta$, and in which:
$e_1$ is the thickness of the sample;
a is the size of the crack; and
U is the potential energy of the sample.

Figure 7:
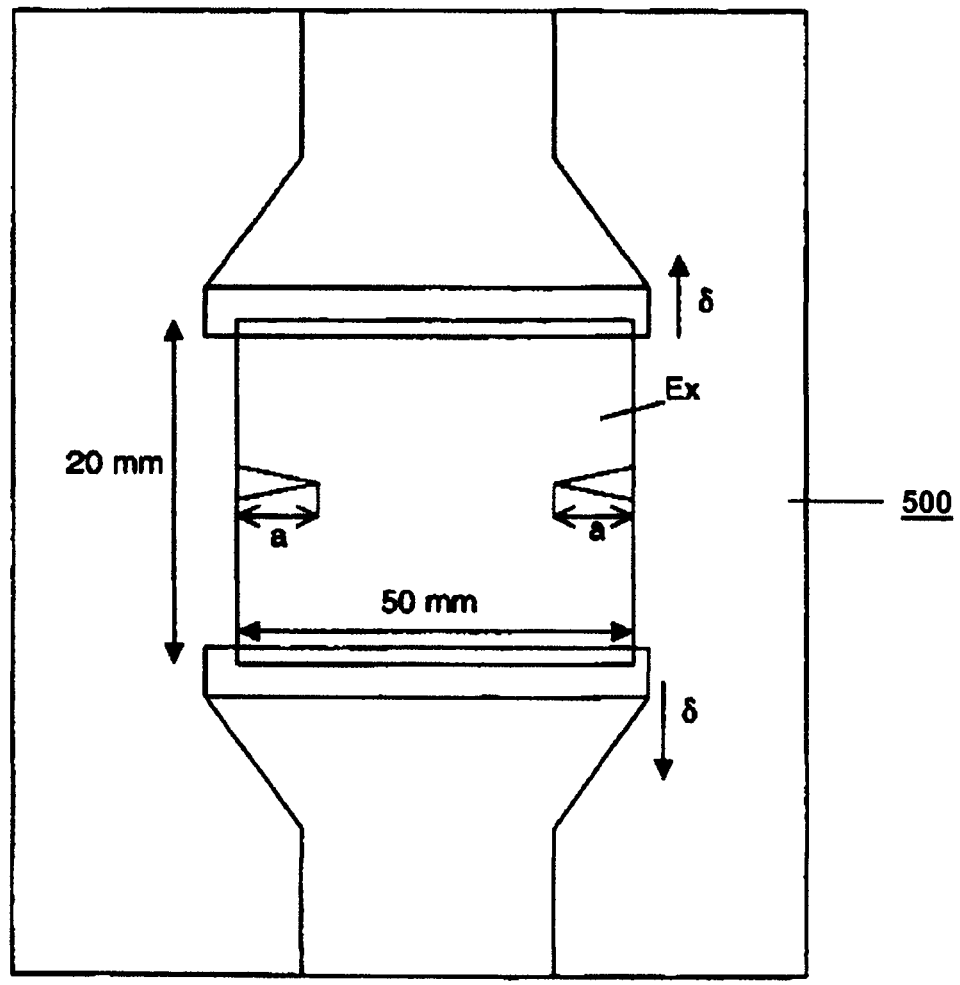
FIG. 7 is a schematic view of an experimental device for evaluating the tear strength of an interlayer.

The experimental device for determining the tear strength is illustrated in FIG. 7. Tensile tests using a tension-compression machine 500 are carried out on several samples $Ex_n$, for example four samples, of the same material and with a surface area equal to 100 mm$^2$ (50 mm in length by 20 mm in width). Each sample is notched on its sides and perpendicular to the tensile force, with a different crack length a for each sample $Ex_n$, corresponding to 5, 8, 12 and 15 mm respectively.

Each sample $Ex_n$ is stretched perpendicular to the cracks 20 at a stretch rate of 100 mm/min and over a given stretch length or distance $\delta$, and in an environment in which the temperature is 20° C.

According to the method described in detail in EP-A-1 495 305, it is possible to establish a curve of variation of the crack tip energy J as a function of the stretch 5 undergone by the sample (not represented). Using a video camera which displays the propagation of the crack 20, it is then detected at which displacement $\delta_c$ the propagation of the crack in the sample starts. Then, from the curve J($\delta$), the value of the critical energy $J_c$ for initialization of the tearing of the sample, corresponding to the displacement $\delta_c$, is deduced. It is at this critical value $J_c$ that the material tears and that it is consequently mechanically damaged with respect to the required mechanical function.

The tear strength or critical energy $J_{c\text{-}ref}$ measured for the interlayer of the reference glazing unit "33.2", which satisfies the requirements of class 1B1 of the EN 12600 standard, is 18 000 J/m$^2$.

Using the curve $C_1$, the minimum required interlayer thickness $e_{i\text{-}min}$ corresponding to a minimum required interlayer tear strength value $J_{c\text{-}min}$ equal to the tear strength of the interlayer of the reference laminated glazing unit $J_{c\text{-}ref}$ that is to say equal to 18 000 J/m$^2$, is then deduced. As shown on curve $C_1$ of FIG. 2, the minimum required interlayer thickness $e_{i\text{-}min}$ is equal to 0.62 mm in this example.

Thus, it is possible to size the laminated glazing unit 1 with a thickness $e_{i\text{-}dim}$ of the interlayer 7 greater than or equal to the minimum required interlayer thickness $e_{i\text{-}min}$=0.62 mm. A laminated glazing unit 1 is thus obtained that satisfies the requirements of class 1B1 of the EN 12600 standard, which comprises two glass substrates 3 and 5 having a thickness of 3 mm and an interlayer 7 of chemical composition $c_i$ having a thickness of less than 0.76 mm bonded between the substrates.

As illustrated in this example, the sizing process in accordance with the invention allows an optimum sizing of a laminated glazing unit so that it withstands predetermined stresses, that is to say with a minimum total thickness of the laminated glazing unit. In particular, by virtue of the invention, it is possible, in order to pass the same class of performance of the same standard, to systematically replace a known glazing unit with a thinner glazing unit. In the preceding example, it is thus possible, in order to pass class 1B1 of the EN 12600 standard, to replace the known reference glazing unit "33.2" with a thinner glazing unit comprising two glass substrates having a thickness of 3 mm and a PVB interlayer of chemical composition $c_i$ having a thickness $e_{i\text{-}dim}$, where 0.62 mm≤$e_{i\text{-}dim}$≤0.76 mm.

Preferably, the interlayer thickness $e_{i\text{-}dim}$ of a laminated glazing unit sized as in the preceding example is only greater than the minimum required interlayer thickness value $e_{i\text{-}min}$ within a limit of 20% above this value, that is to say, in the preceding example, $e_{i\text{-}dim}$ is preferably such that 0.62 mm≤$e_{i\text{-}dim}$≤0.74 mm.

An analogous sizing process, applied to class 2B2 of the EN 12600 standard, leads in the same way, using the curve $C_2$ of FIG. 2, to the identification of a minimum required interlayer thickness $e_{imin}$ equal to 0.3 mm for a laminated glazing unit 1 comprising two glass substrates 3 and 5 having a thickness of 3 mm and an interlayer 7 based on PVB that has the specific chemical composition $c_i$ and is bonded between the substrates. In this case, one example of a reference laminated glazing unit is of "33.1" type, that is to say comprises two glass substrates each having a thickness of 3 mm and one interlayer ply of standard thickness having the specific composition $c_i$, which corresponds to an interlayer thickness $e_{i\text{-}ref}$ of the reference laminated glazing unit equal to 0.38 mm.

Preferably, the interlayer thickness $e_{i\text{-}dim}$ of a laminated glazing unit sized in order to satisfy the requirements of class 2B2 is only greater than the minimum required interlayer thickness value $e_{i\text{-}min}$, within a limit of 20% above this value, that is to say, in the preceding example, $e_{i\text{-}dim}$ is preferably such that 0.3 mm≤$e_{i\text{-}dim}$≤0.36 mm.

The interlayer 7 of chemical composition $c_i$ considered in the preceding examples has average performances from the point of view of its tear strength. In particular, there are other chemical compositions of interlayers, based on PVB or on other materials, for which the tear strength performances are greater than those of the interlayers of chemical composition $c_i$. The tear strength levels of the best performing interlayer compositions currently known make it possible to envisage minimum required interlayer thicknesses $e_{i\text{-}min}$ that are further reduced with respect to the values given previously by way of example.

Thus, for a laminated glazing unit suitable for withstanding the stresses corresponding to class 1B1 of the EN 12600 standard and that comprise two glass substrates having a thickness of 3 mm, the minimum required interlayer thickness $e_{i\text{-}min}$ may drop to around 0.5 mm. Therefore, the optimized interlayer thickness $e_{i\text{-}dim}$ of a laminated glazing unit that meets the requirements of class 1B1 of the EN 12600 standard and that comprises two glass substrates having a thickness of 3 mm, is generally such that 0.5 mm≤$e_{i\text{-}dim}$≤0.74 mm, the lower limit of this interval corresponding to the chemical compositions of interlayers that have high performances from the point of view of their tear strength.

Similarly, for a laminated glazing unit suitable for withstanding the stresses corresponding to class 2B2 of the EN 12600 standard and that comprise two glass substrates having a thickness of 3 mm, the minimum required interlayer thickness $e_{i\text{-}min}$ may drop to around 0.25 mm, so that the optimized interlayer thickness $e_{i\text{-}dim}$ of a laminated glazing unit that meets the requirements of class 2B2 of the EN 12600 standard and that comprises two glass substrates having a thickness of 3 mm, is generally such that 0.25 mm≤$e_{i\text{-}dim}$≤0.36 mm, the lower limit of this interval corresponding, as above, to the chemical compositions of interlayers that have high performances from the point of view of their tear strength.

For the manufacture of thinner laminated glazing units according to the invention comprising an interlayer of non-standard thickness $e_{i\text{-}dim}$, that is to say having a thickness other than 0.38 mm, 0.76 mm, 1.14 mm, 1.52 mm, 2.28 mm, it is possible to integrate into the conventional process for manufacturing laminated glazing units a supplementary stretching (or drawing) step, starting from a sheet of the interlayer considered that has a standard thickness, until the non-standard thickness $e_{i\text{-}dim}$ is achieved. As a variant, it is possible to manufacture the interlayer directly by extrusion to the non-standard thickness $e_{i\text{-}dim}$.

Figure 3:
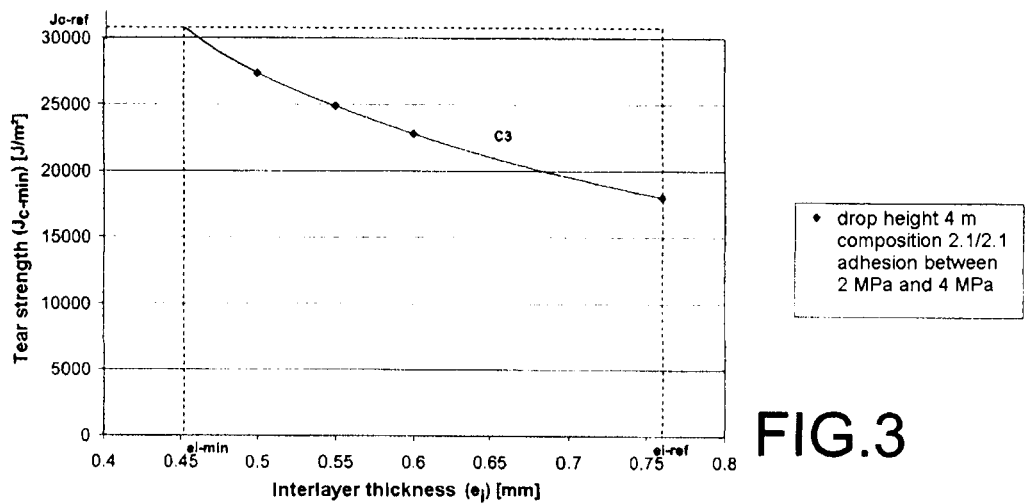
Figure 4:
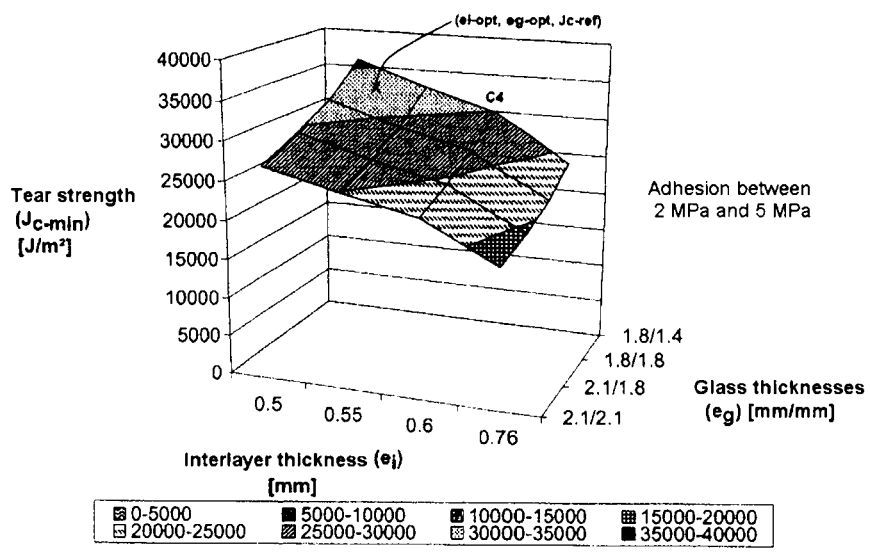

In the embodiments illustrated by the graphs from FIGS. 3 and 4, it is sought to size a laminated glazing unit, for example an automotive vehicle windshield, so that it withstands hard impacts (R43 standard). As above, the laminated glazing unit to be manufactured is, for example, the laminated glazing unit 1 of FIG. 1, which comprises two glass substrates 3 and 5, between which an interlayer 7 of specific chemical composition $c_i$, for example a PVB-based interlayer, is bonded.

In a manner analogous to the first embodiment, with a view to sizing the laminated glazing unit 1 so that it meets the requirements of the R43 standard, it is first verified that the adhesion of the interlayer 7 with respect to the substrates 3 and 5 is satisfactory. For this purpose, the adhesion strength τ of the interlayer 7 is evaluated as described above and it is checked that the value of the adhesion strength τ is within a range of admissible values so that any laminated glazing unit withstands the stresses corresponding to the R43 standard. According to the invention, this range of admissible values is determined experimentally from normalized mechanical strength tests defined in the R43 standard, which are carried out on laminated glazing units of different compositions.

The range of admissible values for the R43 standard, within which any value of the adhesion strength τ is suitable for satisfying the criterion of adhesion, is all of the values below 5 MPa. Preferably, the range of admissible values of the adhesion strength τ for the R43 standard is equal to 2 MPa-5 MPa, the lower limit of this range of values being determined in order to ensure a good transparency of the glazing unit, independently of the mechanical strength considerations of the glazing unit.

Once it has been verified that the adhesion strength τ of the interlayer 7 lies within the aforementioned range of admissible values, the actual sizing of the laminated glazing unit 1 is carried out. The graphs of FIGS. 3 and 4 illustrate two possible approaches for sizing the glazing unit 1 so that it satisfies the requirements of the R43 standard.

According to a first approach, which corresponds to FIG. 3, the glazing unit 1 is sized as in the first embodiment with a total thickness $e_{g\text{-}dim}$ of glass substrate in the laminated glazing unit that is fixed and equal to 4.2 mm, which corresponds, for example, to a thickness of each glass substrate 3 and 5 of 2.1 mm.

In this case, with a view to sizing the interlayer 7, firstly a curve $C_3$, seen in FIG. 3 and representative of the minimum interlayer tear strength $J_{c\text{-}min}$ required for any given laminated glazing unit, comprising at least one glass substrate and one interlayer having the same chemical composition $c_i$ as the interlayer 7 of the laminated glazing unit 1 to be manufactured, to withstand the stresses corresponding to the R43 standard, is plotted as a function of the interlayer thickness $e_i$ of said any given laminated glazing unit, this curve being established for a substrate thickness $e_g$ equal to 4.2 mm. In practice, the curve $C_3$ is obtained from normalized mechanical strength tests defined in the R43 standard, carried out on laminated glazing units which each comprise at least one glass substrate and one interlayer of chemical composition $c_i$ and which differ from one another by their composition in terms of thickness of their interlayer.

Next, a reference laminated glazing unit is identified which withstands the stresses corresponding to the R43 standard, with a glass substrate thickness equal to 4.2 mm and which comprises an interlayer having the specific chemical composition $c_i$. An example of such a reference laminated glazing unit is the known glazing unit 2.1/0.76/2.1, which comprises two glass substrates each having a thickness of 2.1 mm and two interlayer plies of standard thickness having the composition $c_i$, which corresponds to an interlayer thickness $e_{i\text{-}ref}$ of the reference laminated glazing unit equal to 0.76 mm. The resistance of this reference glazing unit to the stresses corresponding to the R43 standard is verified by a normalized mechanical strength test, in this example with an impactor drop height of 4 m.

The tear strength $J_{c\text{-}ref}$ of the interlayer of the reference glazing unit 2.1/0.76/2.1 is then determined using the Tielking method described above. The value of the tear strength $J_{c\text{-}ref}$ measured for the interlayer of composition $c_i$ of the reference glazing unit 2.1/0.76/2.1 is 31 000 J/m².

Using the curve $C_3$, the minimum required interlayer thickness $e_{i\text{-}min}$ corresponding to a minimum required interlayer tear strength value $J_{c\text{-}min}$ equal to the tear strength of the interlayer of the reference laminated glazing unit $J_{c\text{-}ref}$ is then deduced. As shown on curve $C_3$, the minimum required interlayer thickness $e_{i\text{-}min}$ is equal to 0.45 mm.

Thus, it is possible to size the laminated glazing unit 1 with a thickness $e_{i\text{-}dim}$, of the interlayer 7 greater than or equal to the minimum required interlayer thickness $e_{i\text{-}min}$=0.45 mm. A laminated glazing unit 1 is thus obtained that satisfies the requirements of the R43 standard, which comprises two substrates 3 and 5 having a thickness of 2.1 mm and a PVB interlayer 7 of chemical composition $c_i$ having a thickness of less than 0.76 mm bonded between the substrates.

Preferably, the interlayer thickness $e_{i\text{-}dim}$ of the laminated glazing unit is greater than the minimum required interlayer thickness value $e_{i\text{-}min}$ only within a limit of 20% above this value, that is to say, in the preceding example, $e_{i\text{-}dim}$ is preferably such that 0.45 mm≤$e_{i\text{-}dim}$≤0.55 mm.

According to a second possible approach for sizing the glazing unit 1 so that it satisfies the requirements of the R43 standard, which corresponds to FIG. 4, the glazing unit is sized without arbitrarily setting the glass substrate thickness of the glazing unit.

In this case, a three-dimensional graph $C_4$ is plotted, seen in FIG. 4, that is representative of the minimum interlayer tear strength $J_{c\text{-}min}$ required in order for any given laminated glazing unit, comprising at least one glass substrate and one interlayer having the same chemical composition $c_i$ as the interlayer 7 of the laminated glazing unit 1 to be manufactured, to withstand the stresses corresponding to the R43 standard, as a function both of the interlayer thickness $e_i$ of said any given laminated glazing unit and of the substrate thickness $e_g$ of said any given laminated glazing unit. The graph $C_4$ from FIG. 4 is obtained from normalized mechanical strength tests defined in the R43 standard, carried out on laminated glazing units which each comprise at least one glass substrate and one interlayer of chemical composition $c_i$ and which differ from one another by their composition in terms of interlayer thickness and of substrate thickness.

The tear strength $J_{c\text{-}ref}$ of a reference laminated glazing unit, which withstands the stresses corresponding to the R43 standard and which comprises an interlayer having the specific chemical composition $c_i$ is then determined.

The known laminated glazing unit 2.1/0.76/2.1 described above may, for example, be used as the reference laminated glazing unit, as can the laminated glazing unit 2.1/0.76/1.8 which is also known, which comprises two glass substrates having respective thicknesses of 2.1 mm and 1.8 mm and two interlayer plies of standard thickness having the chemical composition $c_i$, which corresponds to an interlayer thickness $e_{i\text{-}ref}$ equal to 0.76 mm. The tear strength $J_{c\text{-}ref}$ of one or the other reference glazing unit under stresses corresponding to the R43 standard is evaluated as before using the Tielking method.

Using the graph $C_4$, a combination of optimum values $e_{i\text{-}opt}$, $e_{g\text{-}opt}$ of the interlayer thickness and of the substrate thickness which corresponds to a minimum required interlayer tear strength value $J_{c\text{-}min}$ equal to the tear strength of the interlayer of the reference laminated glazing unit $J_{c\text{-}ref}$ is then deduced. The expression "combination of optimum values of the interlayer thickness and of the substrate thickness" is understood to mean a combination for which the total thickness of the laminated glazing unit is minimized. For example, when starting from the reference glazing 2.1/0.76/2.1, which corresponds to a value of the tear strength $J_{c\text{-}ref}$ of 31 000 J/m², the points that provide a combination of optimum values $e_{i\text{-}opt}$, $e_{g\text{-}opt}$ are the points of the area, or surface, of the graph $C_4$ which correspond to a $J_{c\text{-}min}$ value of 31 000 J/m². On this subject, it is noted that each of the optimum values $e_{i\text{-}opt}$ or $e_{g\text{-}opt}$ is not necessarily, individually, a minimum value of the interlayer thickness or a minimum value of the substrate thickness. It is the combination of the values $e_{i\text{-}opt}$ and $e_{g\text{-}opt}$ which results in a minimized value of the overall thickness of the laminated glazing unit.

As is seen in the graph $C_4$, the combination of values $e_i$=0.5 mm and $e_g$=1.8 mm/1.4 mm is a combination of values greater than or equal to a combination of optimum values. Hence, it is possible to size the laminated glazing unit 1 with a thickness $e_{i\text{-}dim}$ of the interlayer 7 that is greater than or equal to 0.5 mm and thicknesses $e_{g\text{-}dim}$ of the substrates 3 and 5 of 1.8 mm and 1.4 mm, respectively, this laminated glazing unit 1 satisfying the requirements of the R43 standard.

As explained in the first embodiment, the interlayer of chemical composition $c_i$ considered in the above examples has average performances from the point of view of its tear strength and the tear strength levels of the best-performing chemical compositions of interlayers currently known make it possible to envisage combinations of optimum values $e_{i\text{-}opt}$, $e_{g\text{-}opt}$ that are further reduced compared to the values given previously.

In particular, for a laminated glazing unit suitable for withstanding the stresses corresponding to the R43 standard and that comprises two glass substrates having respective thicknesses of 1.8 mm and 1.4 mm, the minimum required interlayer thickness $e_{i\text{-}min}$ may drop to around 0.4 mm. Hence, the optimized interlayer thickness $e_{i\text{-}dim}$ of a laminated glazing unit corresponding to the requirements of the R43 standard and that comprises two glass substrates having respective thicknesses of 1.8 mm and 1.4 mm is, generally, such that 0.4 mm≤$e_{i\text{-}dim}$≤0.74 mm, the lower limit of this interval corresponding to the chemical compositions of interlayers that have high performances from the point of view of their tear strength.

If it is desired that the interlayer 7 of the laminated glazing unit 1 has both mechanical strength and acoustic insulation properties, it is advisable to select the interlayer 7 for its acoustic performances prior to evaluating the adhesion strength τ and the actual sizing using the graph of the minimum tear strength $J_{c\text{-}min}$ as a function of the interlayer thickness $e_i$ and/or of the substrate thickness $e_g$.

For this purpose, the selection technique described in patent application EP-A-0 844 075 is used. According to this selection technique, the elastic component (or shear modulus) G' and the tangent of the loss angle (or loss factor) tan δ of the material of the interlayer are evaluated using a viscoanalyzer.

The viscoanalyzer makes it possible to subject a sample of the material to strains under precise temperature and frequency conditions, and thus to obtain and process all of the rheological quantities that characterize the material. The processing of the raw data of the measurements of force, displacement and phase shift as a function of the frequency, at each temperature, makes it possible to calculate the magnitudes of the shear modulus G' and of the tangent of the loss angle tan δ.

It has been shown that a good acoustic interlayer must have a loss factor tan δ greater than 0.6 and a shear modulus G' of less than $2 \times 10^7$ N/m$^2$, for a temperature of 20° C. and a frequency of 50 Hz.

Once the material of the interlayer has been chosen for its acoustic properties, its adhesion is evaluated, then the laminated glazing unit is sized in accordance with the process of the invention.

As it emerges from the embodiments described previously, the process according to the invention makes it possible to determine optimum substrate and/or interlayer thicknesses for a laminated glazing unit while guaranteeing that the glazing unit obtained withstands predetermined stresses. In particular, by virtue of the invention, it is possible, for a class of performance of a standard, to systematically seek a thinner version of a known glazing unit that satisfies the requirements of this class of performance. It is thus possible to avoid significant oversizing of laminated glazing units, which is not possible with the known methods of sizing laminated glazing units.

This stems, on the one hand, from the fact that the process according to the invention takes into account and allows a variation of all of the parameters that influence the mechanical strength of the laminated glazing unit, which are the adhesion of the interlayer with respect to the substrate, the interlayer tear strength, the interlayer thickness, the substrate thickness. On the other hand, the process according to the invention enables a direct determination of the optimized interlayer and substrate thicknesses, which is not by trial and error as was the case with the known sizing methods, by virtue of the graph that gives the minimum required tear strength as a function of the thicknesses.

This results in the possibility, for each laminated glazing unit application, to reduce the interlayer and/or substrate thicknesses of the laminated glazing units relative to the laminated glazing units currently used, with a resulting reduction of the production cost and of the weight of the laminated glazing units, while guaranteeing the performances of these glazing units in terms of mechanical strength. In particular, it is possible to reduce the interlayer thickness, the substrate thickness or both at the same time, and thus to reduce the total thickness of the laminated glazing unit.

It is clearly understood that a laminated glazing unit according to the invention, sized to achieve a certain mechanical strength, may comprise one or more substrates having a glass function, and likewise a monolithic interlayer or else a plurality of interlayers separated by various substrates. In any case, the sum of the thicknesses of the substrates corresponds to the substrate thickness $e_{g\text{-}dim}$ and the sum of the thicknesses of the interlayers corresponds to the interlayer thickness $e_{i\text{-}dim}$, where $e_{g\text{-}dim}$ and $e_{i\text{-}dim}$ are determined by virtue of the graph that gives the minimum required tear strength as a function of the thicknesses.

The invention is not limited to the examples described and represented. In particular, the invention has been illustrated from examples of laminated glazing units that use at least one glass substrate and at least one PVB interlayer of chemical composition $c_i$. The invention may however be applied to any type of laminated glazing unit, having a given chemical composition of its or each of its substrates with a glass function and a given chemical composition of its or each of its polymer interlayers. It may in particular be applied for a laminated glazing unit comprising at least one substrate having a glass function that is made of plastic. It may also be applied for a laminated glazing unit comprising at least one PVB interlayer having a chemical composition different from the composition $c_i$, or else for a laminated glazing unit comprising at least one interlayer constituted of/based on a polymer material having viscoelastic properties other than PVB such as, by way of nonlimiting examples, ethylene vinyl acetate (EVA) or polyurethane (PU).

Furthermore, the process according to the invention was illustrated above for cases in which either the substrate thickness is set to a known reference value and the interlayer thickness is optimized, or the two substrate and interlayer thicknesses are optimized simultaneously. The sizing process according to the invention may however also be carried out by setting the interlayer thickness to a known reference value and by optimizing only the substrate thickness, using a graph representative of the minimum interlayer tear strength $J_{c\text{-}min}$ as a function of the substrate thickness $e_g$, this graph being established for an interlayer thickness of the laminated glazing unit equal to the known reference value.

The invention claimed is:

1. A process for manufacturing a laminated glazing unit product so that it withstands a predetermined stress, comprising:
    at least one substrate having a glass function and a first chemical composition; and
    at least one polymer interlayer having a second chemical composition,
    the process comprising:
    identifying a reference laminated glazing unit that withstands the predetermined stress and that comprises at least one substrate having the first chemical composition of the at least one substrate of the laminated glazing unit product, and at least one interlayer having the second chemical composition;
    determining a tear strength ($J_{c\text{-}ref}$) of the interlayer of the reference laminated glazing unit, a thickness ($e_{i\text{-}ref}$) of the interlayer of the reference laminated glazing unit, and a thickness ($e_{g\text{-}ref}$) of the substrate of the reference laminated glazing unit;
    graphing a minimum interlayer tear strength ($J_{c\text{-}min}$) as a function of an interlayer thickness ($e_i$), of a substrate thickness ($e_g$), or of both
    deducing from the graph a combination of optimum values ($e_{i\text{-}opt}$, $e_{g\text{-}opt}$) respectively of an interlayer thickness and of a substrate thickness corresponding to a value of a minimum required interlayer tear strength ($J_{c\text{-}min}$) equal to the tear strength of the interlayer of the reference laminated glazing unit ($J_{c\text{-}min} = J_{c\text{-}ref}$);
    sizing the laminated glazing unit product to withstand the predetermined stress with a chosen interlayer thickness ($e_{i\text{-}dim}$) greater than or equal to the optimum value of the interlayer thickness ($e_{i\text{-}opt}$) and a chosen substrate thickness ($e_{g\text{-}dim}$) greater than or equal to the optimum value of the substrate thickness ($e_{g\text{-}opt}$)
    wherein the minimum interlayer tear strength ($J_{c\text{-}min}$) is a strength required so that a given laminated glazing unit, comprising at least one substrate having the first chemical composition of the substrate of the laminated glazing unit product and one interlayer having the second chemical composition, withstands the predetermined stress.

2. The process of claim 1, wherein the chosen substrate thickness ($e_{g\text{-}dim}$) is equal to the substrate thickness of the reference laminated glazing unit ($e_{g\text{-}dim} = e_{g\text{-}ref}$) and the sizing further comprises:
graphing a minimum interlayer tear strength ($J_{c\text{-}min}$) as a function of the interlayer thickness ($e_i$), for a laminated glazing unit with a substrate thickness equal to the substrate thickness of the reference laminated glazing unit ($e_g = e_{g\text{-}ref}$)
deducing from the graph a minimum required interlayer thickness ($e_{i\text{-}min}$) corresponding to the minimum required interlayer tear strength ($J_{c\text{-}min}$) equal to the tear strength of the interlayer of the reference laminated glazing unit ($J_{c\text{-}min} = J_{c\text{-}ref}$);
sizing the laminated glazing unit product to withstand the predetermined stress with a chosen interlayer thickness ($e_{i\text{-}dim}$) greater than or equal to the minimum required interlayer thickness ($e_{i\text{-}min}$) and a chosen substrate thickness ($e_{g\text{-}dim}$) equal to the substrate thickness of the reference laminated glazing unit ($e_{g\text{-}ref}$).

3. The process of claim 1,
wherein the chosen interlayer thickness ($e_{i\text{-}dim}$) is equal to the interlayer thickness of the reference laminated glazing unit ($e_{i\text{-}dim} = e_{i\text{-}ref}$) and
the sizing further comprises:
graphing the minimum interlayer tear strength ($J_{c\text{-}min}$) as a function of the substrate thickness ($e_g$), for a laminated glazing unit with an interlayer thickness equal to the interlayer thickness of the reference laminated glazing unit ($e_i = e_{i\text{-}ref}$)
deducing from the graph a minimum required substrate thickness ($e_{g\text{-}min}$) corresponding to a value of the minimum required interlayer tear strength ($J_{c\text{-}min}$) equal to the tear strength of the interlayer of the reference laminated glazing unit ($J_{c\text{-}min} = J_{c\text{-}ref}$);
sizing the laminated glazing unit product to withstand the predetermined stress with a chosen interlayer thickness ($e_{i\text{-}dim}$) equal to the interlayer thickness of the reference laminated glazing unit ($e_{i\text{-}ref}$) and a chosen substrate thickness ($e_{g\text{-}dim}$) greater than or equal to the minimum required substrate thickness ($e_{g\text{-}min}$).

4. The process of claim 1, wherein at least one of the chosen thicknesses is less than the corresponding thickness of the reference laminated glazing unit ($e_{i\text{-}dim} < e_{i\text{-}ref}$ or $e_{g\text{-}dim} < e_{g\text{-}ref}$ or both).

5. The process of claim 1, further comprising:
plotting the graph from mechanical strength tests on laminated glazing units of different compositions in terms of interlayer thickness, of substrate thickness or of both interlayer thickness and substrate thickness,
wherein the plotting is prior to the sizing of the laminated glazing unit.

6. The process of claim 1, further comprising:
verifying that an adhesion of the interlayer of the laminated glazing unit product is satisfactory with respect to the substrate of the laminated glazing unit product,
wherein the verifying is prior to the sizing of the laminated glazing unit.

7. The process of claim 6, wherein the verifying comprises:
twisting a sample of the interlayer bonded to the substrate,
measuring the torsional force (F) at which separation of the interlayer from the substrate is initiated,
calculating from this force (F) the corresponding adhesion shear strength ($\tau$), and
comparing the adhesion shear strength ($\tau$) with a range of admissible values so that any laminated glazing unit withstands the predetermined stress.

8. The process of claim 1, wherein identifying the reference laminated glazing unit comprises a mechanical strength test on the reference laminated glazing unit.

9. The process of claim 1, wherein determining the tear strength ($J_{c\text{-}ref}$) of the interlayer of the reference glazing unit employs the Tielking method.

10. The process of claim 1, further comprising:
verifying that the acoustic insulation properties of the interlayer of the laminated glazing unit product are satisfactory prior to the sizing of the laminated glazing unit.

11. The process as claimed in claim 10, wherein the acoustic insulation properties of the interlayer of the laminated glazing unit product are satisfactory when the interlayer has a loss factor tan $\delta$ greater than 0.6 and a shear modulus G' less than $2 \times 10^7$ N/m$^2$ for a temperature of 20° C. and a frequency of 50 Hz.

* * * * *